United States Patent [19]

Yamanaka

[11] 4,042,956

[45] Aug. 16, 1977

[54] SOLID STATE TELEVISION CAMERA HAVING A SPECIAL COLOR FILTER ARRANGEMENT

[75] Inventor: Seisuke Yamanaka, Tokyo, Japan

[73] Assignee: Sony Corporation, Tokyo, Japan

[21] Appl. No.: 606,479

[22] Filed: Aug. 21, 1975

[30] Foreign Application Priority Data

Aug. 22, 1974 Japan .................................. 49-96367

[51] Int. Cl.² ............................................ H04N 9/04
[52] U.S. Cl. ................................................... 358/41
[58] Field of Search ..................... 358/41, 43, 44, 213, 358/48; 178/7.1; 357/24, 30–32; 250/211 J

[56] References Cited

U.S. PATENT DOCUMENTS

| 3,087,985 | 4/1963 | Heijne et al. | 358/44 |
| 3,717,724 | 2/1973 | Montgomery | 358/43 |
| 3,777,061 | 12/1973 | Takemura | 358/44 |

FOREIGN PATENT DOCUMENTS

1,092,881   11/1967   United Kingdom ................... 358/44

Primary Examiner—John C. Martin
Assistant Examiner—Mitchell Saffian
Attorney, Agent, or Firm—Hill, Gross, Simpson, Van Santen, Steadman, Chiara & Simpson

[57] ABSTRACT

In a solid state television camera, there are disposed a first color filter including primary color elements and complementary color elements therefor aligned alternately in the horizontal direction and a second color filter including second primary color elements and complementary color elements therefor aligned in the same manner onto sensing units of a charge coupled image sensor alternately relative to odd and even lines. The positions of respective sensing points of the sensing units are so selected that vectors of side band components of signals obtained by adding signals from successive odd and even lines are symmetrical with respect to the detecting axis of a phase detector when panchromatic light is projected on the image sensor through the first and second color filters.

6 Claims, 17 Drawing Figures

SOLID STATE TELEVISION CAMERA HAVING A SPECIAL COLOR FILTER ARRANGEMENT

BACKGROUND OF THE INVENTION

1. Field of the Invention

This invention relates generally to solid state color cameras, and more particularly to such a solid state color camera which employs a charge transfer device and specially designed color filters.

2. Description of the Prior Art

In devices using solid state sensors such as charge-coupled devices, hereinafter referred to as CCDs, as image pickup devices of a television camera, light information is converted into electrical signals which is sampled at every picture element. If it is assumed that the sampling frequency is $f_c$, the alignment pitch, $\tau_H$, of the picture elements in the horizontal direction is $1/f_c$. The electric charges stored in the respective picture elements are transferred to an output terminal at the rate of a clock pulse frequency and derived as a form of serial video signal. The resultant video signal $S_y$ contains DC components $S_{DC}$ and side band components $S_{SB}$ of sampling frequency $f_c$ modulated with the DC components $S_{DC}$. In this case, there are upper and lower side band components $S_{SB}$ of the sampling frequency $f_c$. If the frequency band of the DC component $S_{DC}$ is selected sufficiently wide so as to increase the resolution, higher band components $S_{DH}$ of the DC component $S_{DC}$ of the DC component $S_{DC}$ are superimposed on the side band component $S_{SB}$ of the sampling frequency $f_c$ and hence a sampling error results. If a picture is reproduced from the above video signal as it is, a flicker is caused in the reproduced picture. Since this is caused by the sampling error, the flicker can be avoided by restricting the frequency band of the DC component $S_{DC}$ to be smaller than one-half of the sampling frequency $f_c$ according to Nyquist's theorem. However, if the frequency band of the DC component $S_{DC}$ is restricted as above, the resolution is deteriorated. In order to make the frequency band of the DC component $S_{DC}$ about 3.5 $MH_Z$ without deteriorating the resolution and without sampling error, it is sufficient that the sampling frequency $f_c$ be selected sufficiently high. Since the sampling frequency $f_c$ is obtained by the product of $n \cdot f_H (f_c = n \cdot f_H)$ where $n$ is the number of picture elements in the horizontal direction of the CCDs and $f_H$ is the horizontal frequency of the television signal, if the sampling frequency $f_c$ is made high enough to remove the sampling error, the number $n$ of the picture elements must be increased correspondingly, with the result that the manufacturing of the CCDs becomes costly.

Further, since three color filters or R(red), G(green) and B(blue) stripe color filter elements are used so as to form a color camera, the frequency of carriers for the respective color components is lowered to $\frac{1}{3} f_c$. Accordingly, a sampling error is caused over all the band of the DC component $S_{DC}$, resulting in a reproduced picture of less than the desired quality.

SUMMARY OF THE INVENTION

According to an aspect of this invention, a solid state television camera is provided which comprises image sensing cells aligned in both horizontal and vertical directions together with a color filter having special arrangements of filter elements which correspond to each image sensing cell. First color filements have first primary color elements and complementary color elements therefor which are arranged to be aligned alternately in the horizontal direction with respect to the image sensing cells of every other line, and second color filter elements have second primary color elements and complementary color elements therefor which are similarly arranged with respect to the image sensing cells of the other lines. Means are also provided for projecting a light image on said sensing cells through the color filter, for reading out image information stored in said respective image sensing cells, and for processing said image information to be a suitable form of a color video signal. The positions of respective image sensing cells may be so selected that vector components of side band components of signals obtained by adding image information from successive odd and even lines are symmetrical with respect to a detecting axis of a phase detector when panchromatic light is projected onto said image sensing cells through the color filter.

The novel features which are considered characteristic of the invention are set forth with particularity in the appended claims.

DESCRIPTION OF THE PREFERRED EMBODIMENT

Figure 1:
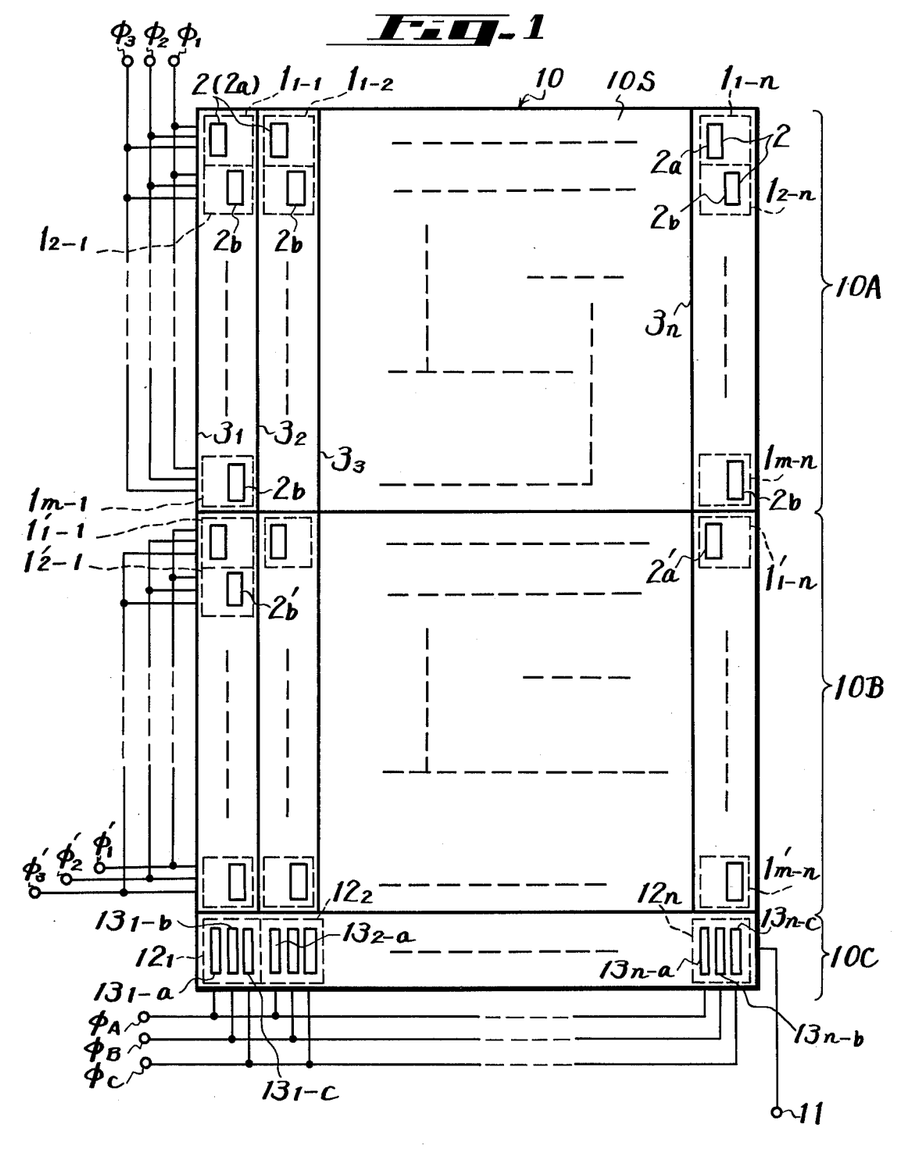
FIG. 1 is a plan view showing an example of solid state image sensors suitable for use with the solid state television camera according to the present invention.

A solid state sensor such a 3-phase CCD useable in the invention are shown in FIG. 1. A 3-phase CCD 10 consists of a photo sensitive array 10A on which a light image of an object (not shown in FIG. 1) is projected. A temporary storage array 10B stores electric charges corresponding to the light information of the image, and a readout register 10C reads out video output signals. The arrays 10A, 10B and register 10C are formed on a semiconductor material such as a silicon substrate 10S. The photo sensitive array 10A has a suitable number of picture elements $l_{1-1}, l_{1-2}, \ldots l_{m-n}$ aligned in the horizontal and vertical directions at a predetermined alignment pitch $\tau_H$ in the horizontal direction. Each of the picture elements $l_{1-1}, l_{1-2}, \ldots, l_{m-n}$ has one photo sensing cell 2. The photo sensing cell of the picture elements on the number horizontal scanning lines are marked with 2a and those on the even number horizontal scanning lines are marked 2b, respectively.

The light information of the image is converted to corresponding electric charges at parts of the semiconductor substrate 10S, namely at the photo sensing cell 2 which are connected with electrodes $\phi_1$, $\phi_2$, and $\phi_3$ supplied with image sensing biases having a predetermined potential relation. Therefore, if a well-known transfer clock pulse applied to the electrodes $\phi_1$ to $\phi_3$, the electric charges stored in the semiconductor substrate 10S corresponding to the respective picture elements $l_{1-1}, l_1\phi_2, \ldots, l_{1-n}, l_{2-1} \ldots, l_{m-h} \ldots, l_{m-n}$ on the horizontal scanning lines are transferred to the temporary storage array 10B and stored at the positions corresponding to the horizontal scanning lines during the vertical blanking period sequentially at every horizontal scanning line. The temporary storage array 10B is formed similarly to the photo sensitive array 10A but is optically shielded as a whole. Therefore, parts of the temporary storage array 10B are shown by similar reference numerals to those of the photo sensitive array 10A with a prime(').

The charges stored in the temporary storage array 10B are read out sequentially with a read-out clock pulse or sampling pulse applied to the read-out register 10C. Thus, a video output signal is derived from an output terminal 11 connected to the read-out register 10C. The read-out register 10C has read-out elements $12_1, 12_2, \ldots, 12_n$ aligned in the horizontal direction and corresponding in number to the picture elements of the array 10B or 10A in one horizontal scanning line. Since the reading out is done with 3-phase sampling pulses applied to electrodes $\phi_A$, $\phi_B$, and $\phi_C$, the read-out elements $12_1, \ldots, 12_n$ have three read-out units $13_{l-a}$, $13_{l-b}$ and $13_{l-c}, \ldots, 13_{n-a}, 13_{n-a}$ and $13_{n-c}$, respectively.

According to the present invention, a specially designed color filter is located in front of the 3-phase CCD 10 described as above so as to project the color separated image of an object on the 3-phase CCD 10 and to obtain a desired color video signal. The color filter includes first to fourth color filter elements which may pass therethrough different color lights in accordance with the picture elements $l_{l-h} \ldots l_{m-n}$ provided in the photo sensitive array 10A.

Figure 2:
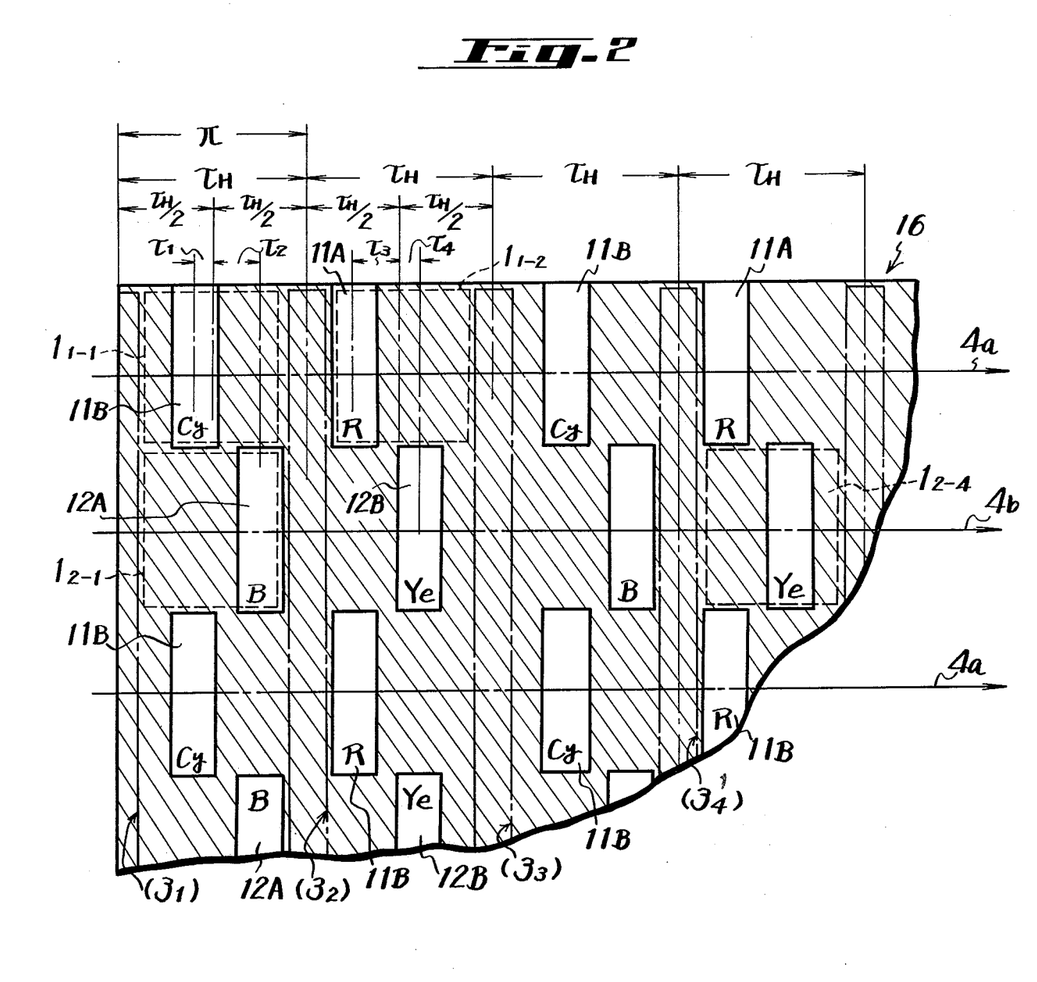
FIG. 2 is a partial plan view showing an example of color filters suitable for use in the solid state television camera of the invention.

An example of the color filter suitable for use with the present invention will be now described with reference to FIG. 2. In FIG. 2, if the sections of a color filter 16 corresponding to picture elements of the 3-phase CCD 10 are shown by dotted line blocks, and the sections of the color filter 16 facing the channel stops $3_1, 3_2 \ldots$ are shown by one-dot chain line blocks, respectively, the color filter 16 is divided into a plurality of sections having each section corresponding to one picture element as a unit. When the color filter 16 constructed as above is located at the front of the 3-phase CCD 10, the parts of the color filter 16 including at least sections facing the photo sensing cells 2 of the 3-phase CCD 10 or the sections having the width $\tau H/4$ (without cross hatching) are formed as light-permeable portions and the other parts (with cross hatching) are formed as light-shielding portions respectively.

In FIG. 2, if a one-dot chain arrow 4a designates the scanning position of the horizontal scanning line at an odd number and another one-dot chain line arrow 4b designates the scanning position of the horizontal scanning at an even number, the color filter 16 is constructed such that first and second filter elements 11A and 11B having desired color selectivities are arranged sequentially alternately in the plural sections on the odd horizontal scanning line 4a, respectively, while third and fourth filter elements 12A and 12B having color selectivities different from those of the former are arranged sequentially and alternately in the plural sections on the even horizontal scanning line 4b.

The lights passing through the first and third light permeable filter elements 11A and 12A are selected to be different primary color lights, while those passing through the second and fourth light permeable filter elements 11B and 12B are selected to be complementary color lights therefor, respectively. In this case, the common color light to these complementary color lights is selected different from the above two primary color lights. By way of example, if the primary color light passed through the first filter element 11A is selected as the red color light R as shown in FIG. 2, that passed through the second filter element 11B is naturally selected as its complementary color, namely cyan color light $C_y$ as shown in FIG. 2. Similarly, if the primary color light passed through the third filter element 12A is selected as the blue color light B, that passed through the fourth filter element 12B naturally becomes yellow color light $Y_e$. In the following description, the color filter 16 is taken to have the above mentioned color selectivities.

In the color filter 16, the positional relationship between the first and second filter elements 11A and 11B and that between the third and fourth filter elements 12A and 12B are selected as follows. That is, these relations are so selected that when a black and white object is picked up by the television camera using the above color filter 16, vector outputs which will be described later, become zero.

Figures 3A, 3B:
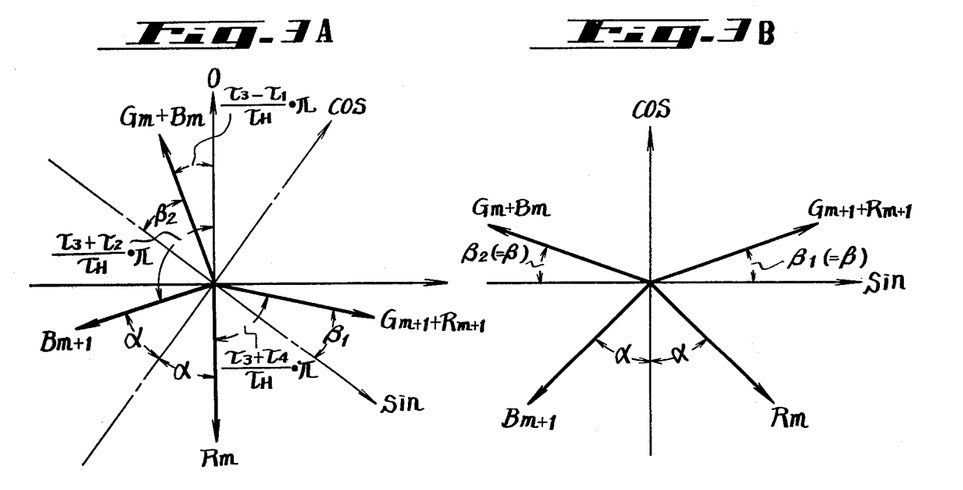
FIGS. 3A and 3B are phasor diagrams showing the phase relationships of color components of the color filter shown in FIG. 2.

One example, which may satisfy the above condition, will be now described. The light permeable portion has the two filter elements 11A and 11B as its unit, and the units are repeatedly arranged in the horizontal scanning direction with an arranging frequency of $2\pi$ when the arranging pitch $\tau_H$ of the picture elements is taken as $\pi$ in angle. As a result, the phase relationships of color components obtained from an odd horizontal scanning line (mth scanning line) and an even horizontal scanning line [$(m+1)$ scanning line] become as shown in FIG. 3A. In FIG. 3A, if the bisector of an angle $2\alpha$ between vectors $R_m$ and $B_{m+1}$ is taken as a new axis (cos-axis), and an axis perpendicular to the cos-axis is taken as the sin-axis, the above phase relationship can be shown in FIG. 3B.

If it is assumed that the distance from the center of the first picture elements $l_{1-1}, l_{2-1}, \ldots, l_{m-l}$ to the center of the second filter element 11B is taken as $\tau_l$; the distance from the center of the first picture elements $l_{1-1}, l_{1-1}, \ldots, l_{m-l}$ to the center of the third filter element 12 is taken as $\tau_2$; and the distances from the center of the second picture elements $l_{1-2}, l_{2-2}, \ldots, l_{m-2}$ to the center of the first filter element 11A and to the center of the fourth filter element 12B are taken as $\tau_3$ and $\tau_4$, respectively, angles $\alpha$, $\beta_1$ and $\beta_2$ shown in FIG. 3A can be expressed as follows:

$$\alpha = \frac{1}{2}(\pi - \frac{\tau_3 + \tau_2}{\tau_H} \cdot \pi) \tag{1}$$

$$\beta_1 = \alpha + \frac{\pi(\tau_3 + \tau_4)}{\tau_H} - \frac{\pi}{2}$$

$$= \frac{\pi}{2} \cdot \frac{1}{\tau_H}(2\tau_4 + \tau_3 + - \tau_2) \tag{2}$$

$$\beta_2 = \frac{\tau_3 + \tau_2}{\tau_H} \cdot \pi - \frac{\tau_3 - \tau_1}{H} \cdot \pi - (\frac{\pi}{2} - \alpha)$$

$$= \frac{\pi}{2} \cdot \frac{1}{\tau_H}(2\tau_1 + \tau_2 - \tau_3) \tag{3}$$

If $\beta = \beta_1 = \beta_2$ is satisfied, $\beta$ can be expressed from the equations (2) and (3) as follows:

$$\beta = \frac{\pi}{2} \cdot \frac{1}{\tau_H} (\tau_1 + \tau_4) \quad (4)$$

If outputs Scos and Ssin on the cos-and sin-axes in the phase relationships shown in FIG. 3B are obtained, they can be expressed as follows:

$$S\cos = (G_m + G_{m+1}) \sin\beta - {}_{(Rm+1)} \cos\alpha - B_m \sin\beta) - (R_m \cos\alpha - R_{m+1} \sin\alpha) \ldots \quad (5)$$

$$S\sin = (G_{n+1} - G_m + R_{m+1} - B_m) \cos\beta + (R_m - B_{m+1}) \sin\alpha \ldots \quad (6)$$

In this case, if there is a vertical correlation, the mth line and $(m+1)$ line are substantially equal in video information. Therefore, the following relationships can be established.

$$G_m = G_{m+1} = G$$

$$B_m = B_{m+1} = B$$

$$R_m = R_{m+l} = R$$

Thus, if the above relationships are substituted into the equations (5) and (6), the ouputs Scos and Ssin can be expressed as follows:

$$S\cos = 2G\sin\beta - (R+b)(\cos\alpha - \sin\beta) \ldots \quad (7)$$

$$S\sin = (R-B)(\cos\beta + \sin\alpha) \ldots \quad (8)$$

If an object to be picked up is white, $R=B=G=$ certain value A is satisfied. Therefore, it is necessary that the color component or output Scos on the cos-axis at this time is zero. From the condition that the output Scos is zero (Scos=0), the following relationship is established.

$$\cos\alpha = 2\sin\beta \ldots \quad (9)$$

If the equation (9) is substituted into the equations (7) and (8), respectively, the latter is expressed as follows:

$$S\cos = (G - \frac{R+B}{2}) \cos\alpha \quad (10)$$

$$S\sin = (R - B)(\sin\alpha + \sqrt{1 - \frac{1}{4}\cos^2\alpha}) \quad (11)$$

As shown in FIG. 2, when the sum of the distances $\tau_2$ and $\tau_3 (\tau_2 + \tau_3)$ is taken into account, the sum $(\tau_2 + \tau_3)$ is equal to or smaller than $\tau H/2$ because the region having a width corresponding to the width of the channel stop is interposed between the adjacent picture elements without failure.

Upon obtaining the angle $\alpha$ practically, since the angle $\alpha$ is expressed by the equation (1), the equation (1) can be rewritten by using the condition $(\tau_2 + \tau_3 \leq \tau H/2)$ as follows:

$$\alpha = \frac{\pi}{2}\left(\frac{\tau_H - (\tau_2 + \tau_3)}{\tau_H}\right) \leq \frac{\pi}{2}\left(\frac{\tau_H - \frac{\tau_H}{2}}{\tau_H}\right) \leq \frac{\pi}{4} \quad (12)$$

If the output level ratio between the output Scos on the cos-axis and the output Ssin on the sin-axis is taken as $a$, the equation $\cos^2\alpha = 4a^2/\{(a^2-\frac{1}{4})^2 + 4a^2\}$ is obtained from the equations (10) and (11). When the ratio $a$ is selected as approximately 2.3231 ($a \approx 2.3231$), cos-$\alpha$ becomes about 0.706 ($\cos\alpha = 0.706$). Thus $\alpha \approx (\pi/4)$ can be satisfied as apparent from the expression (12).

As a result, the angle $\beta$ can be calculated from the equation (9) as follows:

$$\beta \approx 21° \ldots \quad (13)$$

From the equations (12) and (13) and the equation $\tau_1 + \tau = \tau_3 + \tau_4$, the respective distances can be obtained. That is, the distances $\tau_1$, $\tau_2$, and $\tau_4$ are expressed as follows:

$$\left.\begin{array}{l} \tau_2 = \frac{\tau_H}{2} - \tau_3 \\ \tau_4 = 0.365 \tau_H - \tau_3 \\ \tau_1 = \tau_3 - 0.135 \tau_H \end{array}\right\} \quad (14)$$

If it is assumed that $$\tau_3 = \frac{\tau_H}{4},$$

the following equations (15) is practically obtained from the equations (14).

$$\left.\begin{array}{l} \tau_2 = \tau_3 = \frac{\tau_H}{4} \\ \tau_1 = \tau_4 = 0.115 \tau_H \end{array}\right\} \quad (15)$$

In the color filter 16 shown in FIG. 2, in order to obtain the angles $\alpha$ and $\beta$ expressed by the equations (12) and (13), the positional relationships between the respective filter elements are selected so as to satisfy the distances expressed by the equation (14).

The above example is described for the case where the angle $\alpha$ is selected to be $(\pi/4)$, but is possible that the angle $\alpha$ could be smaller than $(\pi/4)$. In such a case it is, of course, necessary that when the angle $\alpha$ is changed, the angle $\beta$ must also be changed as is apparent from equation (9).

With the present invention, such a color filter 16 is used such that the relative positional relationship between its filter elements is selected so as to make the phase relationship of the video outputs satisfy the angles expressed by, for example, the equations (12) and (13), whereby the desired color video signal is obtained.

Figure 4:
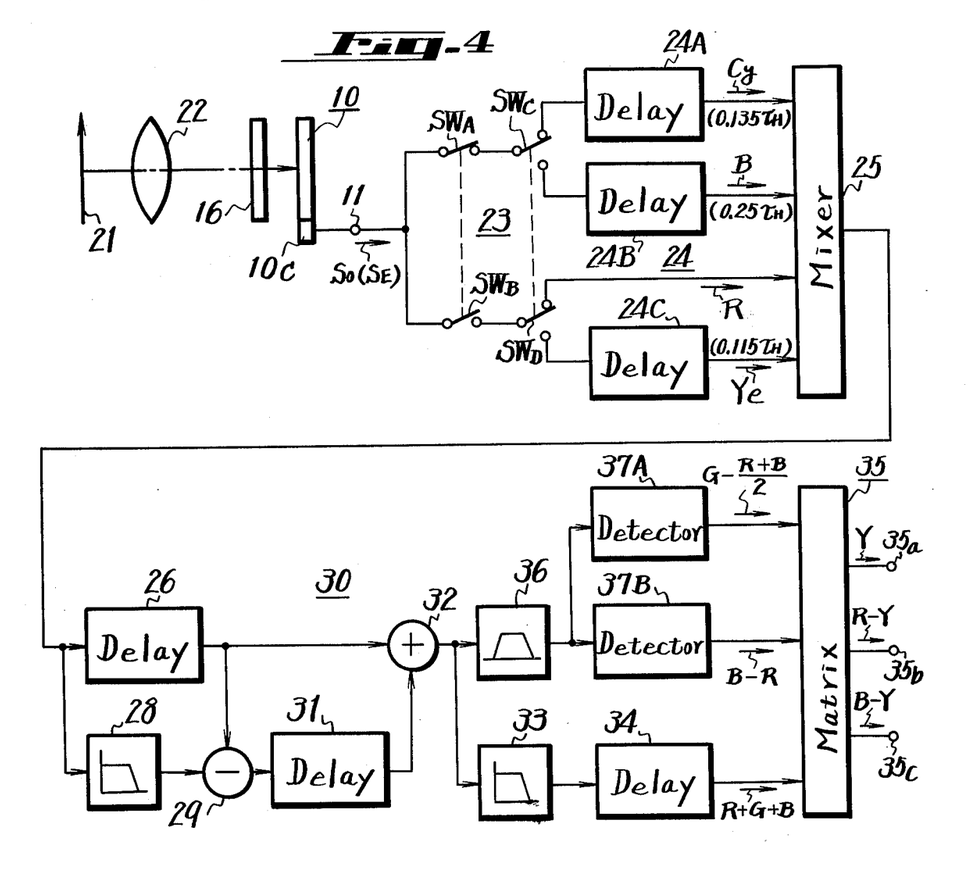
FIG. 4 is a systematic block diagram showing an embodiment of the solid state television camera according to the invention.

An embodiment of the signal processing system of the present invention will be described with reference to FIG. 4. In FIG. 4, reference numeral 21 designates an object to be picked up whose light image is projected on the CCD 10 as desired color separated image through an optical lens system 22 and the color filter 16. The color video signal delivered to an output terminal 11 is supplied through a signal change-over switch group 23 and a delay circuit group 24 to a mixer 25. In detail, the transmission path for the video signals sequentially obtained at every horizontal scanning line is divided into two branches and a pair of change-over switches $SW_A$ and $SW_B$, which are reversed in changing-over state at every picture element in ganged relation, are provided on the branched signal transmission paths. These switches $SW_A$ and $SW_B$ are ganged but are opposite in changing-over state as shown in FIG. 4. At the rear stages of the switches $SW_A$ and $SW_B$, there are provided a pair of switches $SW_C$ and $SW_D$ which are reversed at 1H (H being one horizontal scanning period) in ganged relation.

Figure 5A:
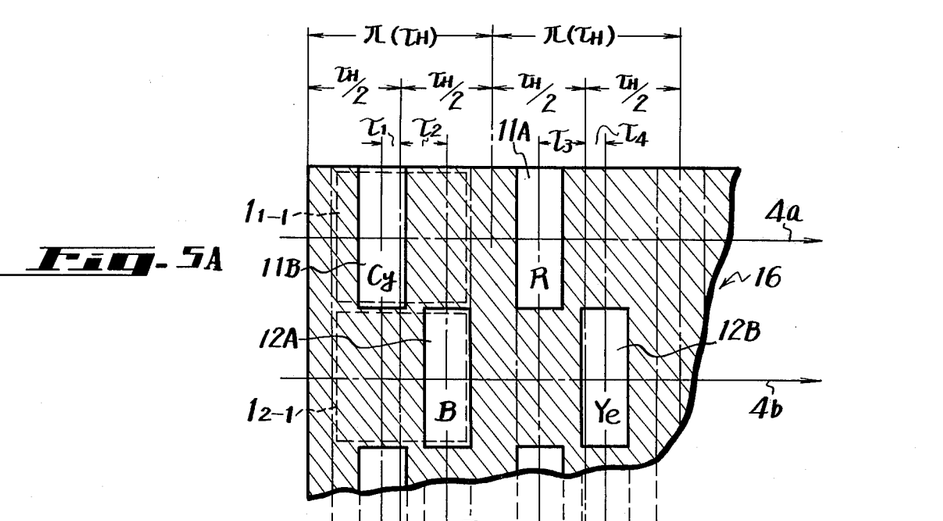
FIGS. 5A to 5E, inclusive, are diagrams used for the explanation of the camera shown in FIG. 4.

The reason why the above change-over switch group 23 and one delay circuit group 24 are provided is as follows: The color video signal obtained from the CCD 10 will be now taken into account. If a video signal $S_O$ based upon light information incident on the photo sensing cells 2a existing on the odd horizontal scanning line 4a shown in FIG. 5A is taken as that shown in FIG. 5B, a video signal $S_E$ derived from the photo sensing cells 2b can be shown in FIG. 5C. In other words, if the condition before signals being transmitted is considered, a time distance $T_1$ between an output $S_{01}$ derived from the second filter element 11B and an output $S_{02}$ derived from the first filter element 11A coincides with the time distance when the light information passes through the filter elements 11A and 11B of the color filter 16 from the spacial point of view.

Figures 5B, 5C, 5D:
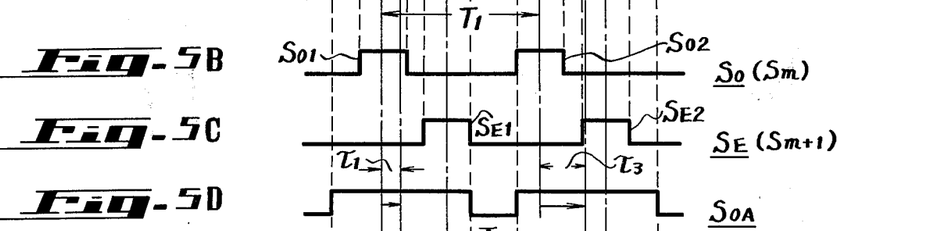

However, the depletion of layer produced by the image sensing biasing applied to the terminals $\phi_1$ to $\phi_3$ provided on the semiconductor substrate $10_S$ under the photo sensing cells 2a and 2b appears not only beneath the photo sensing cells 2a and 2b but also all over the picture elements (same as areas shown by dotted line blocks in FIG. 3A). Therefore, the video signal $S_O$ shown in FIG. 5B is averaged and becomes a signal $S_{OA}$ as shown in FIG. 5D. As a result, a time distance $T_2$ between the centers of the adjacent signals $S_{OA}$ becomes greater than the time distance $T_1$ ($T_2 > T_1$) by a time $\Delta T$. If the time distance $T_1$ is not maintained between the video signals $S_{OA}$ and $S_O$, the phase relationship shown in FIG. 3 cannot be obtained, and accordingly the initial purpose is not achieved.

If for example, the first obtained signal $S_{01}$ of the video signal $S_O$ is intentionally delayed by the time corresponding to $\Delta T$ and the following signal $S_{02}$ is derived as it is, the time distance in this case becomes $T_1$. Accordingly, in the present invention, the video signal $S_O$ is delayed by a desired time period during the time interval when the video signal $S_{01}$ is obtained or the odd number of horizontal scanning period and at every other picture element. The delay circuit 24A shown in FIG. 4 achieves this purpose. The delay time $\Delta T$ thereof is obtained in the following manner. That is, as shown in FIG. 5 the center la of the signal $S_{01}$ in the video signal $S_O$ is shifted to the line L (L $-$ la $= \tau_1 = 0.115\tau_H$) and the center lb of the signal $S_{02}$ is shifted to the line L of second occurrence (L $-$ lb $= \tau_3 = 0.25 \tau_H$). In other words, the video signal $S_O$ is delayed in phase by $\tau_1$ for the signal $S_{01}$ and $\tau_3$ for the signal $S_{02}$. Accordingly, the time difference therebetween ( $= 0.135 \tau_H$) corresponds to the above delay time $\Delta T$.

Figure 5E:
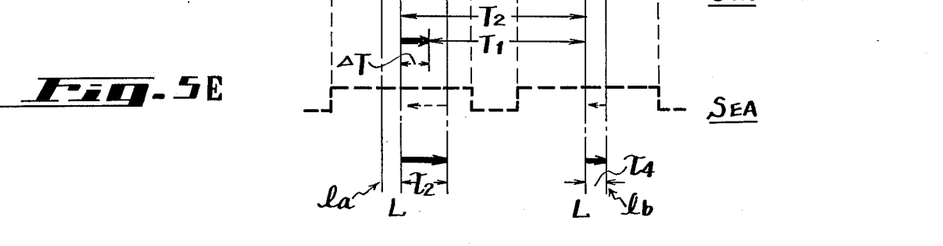

As for the video signal $S_E$ obtained during the horizontal scanning period at even number lines, its averaged signal $S_{EA}$ becomes as shown in FIG. 5E. In this case, however, the signals $S_{E1}$ and $S_{E2}$ are shifted by $\tau_2$ and $\tau_4$, respectively, as shown in FIG. 5E by dotted-line arrows. From the view point of phase relationship, these signals $S_{E1}$ and $S_{E2}$ are advance in phase by 0.25 $\tau_H (= \tau_2)$ and 0.115 $\tau_H(=\tau_4)$, so that if they are selected as delay times, the relationship from a time point of view can be made equal to that from the spacial point of view. In FIG. 4, the delay circuit 24B serves to delay the signal $S_{E1}$, and its delay time is $0.25\tau_H$. Similarly, the other delay circuit 24C is for the signal $S_{E2}$, and its delay time is $0.115\tau_H$.

As described above, the change-over switch group 23 and the delay circuit group 24 are provided to give the obtained signals $S_O$ and $S_E$ with the initial phase relationship, and then the signals are supplied to the mixer 25. The output from the mixer 25 is supplied to an operational circuit system 30 shown in FIG. 4 which produces a desired color video signal.

An operation of the operational circuit system 30 shown in FIG. 4 will now be described with reference to FIGS. 6A to 6E which are graphs showing the phase relationship between the frequency spectra of the video signals $S_O$ and $S_E$ and the side band components of the signals R, G and B.

Figure 6A:
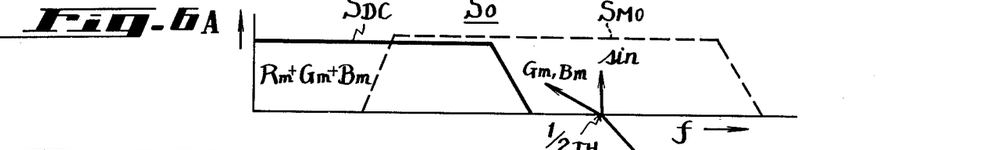
FIGS. 6A to 6E, inclusive are frequency-spectra of video signals including the phase relationships of side band components.
Figure 6B:
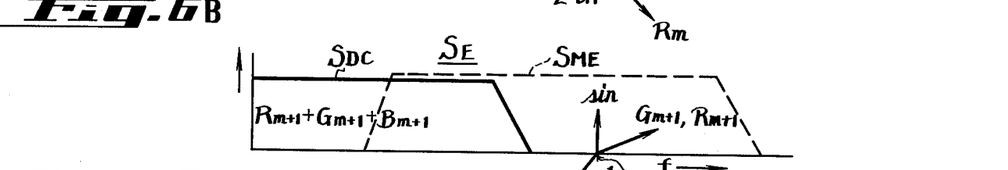
Figure 6C:
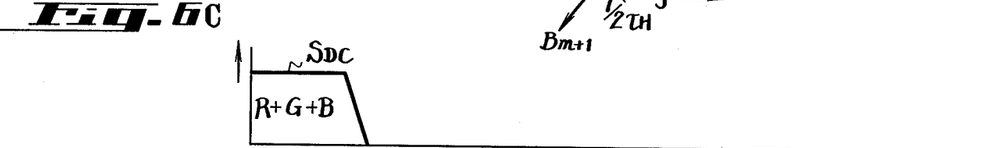
Figure 6D:
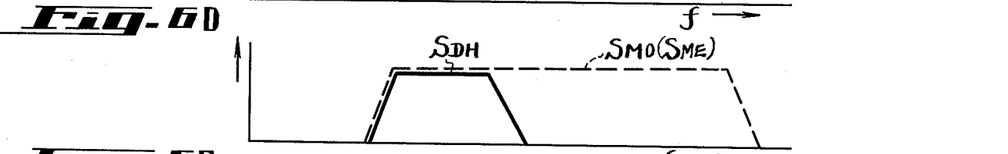
Figure 6E:
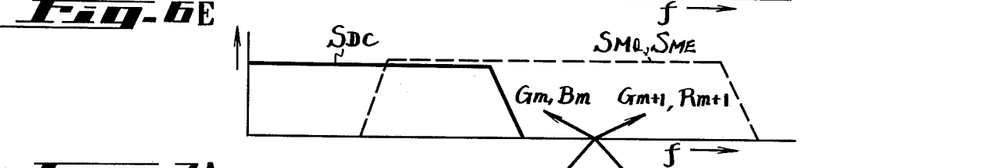

The video signals $S_O$ and $S_E$ (refer to FIGS. 6A and 6B), which are obtained sequentially and alternately at every one horizontal scanning period, are applied to a low filter 28 which passes therethrough a desired band component of the signals (refer to FIG. 6C). The output from the low pass filter 28 and the video signal $S_O$ and $S_E$ which are not restricted in band are supplied to a subtracter 29 which performs the signal operation. The output from the subtracter 29 is side band components $S_{MO}$ (or $S_{ME}$) (refer to FIG. 6D) containing high band components $S_{DH}$ of DC components $S_{DC}$ in their low band side. In FIG. 4, reference numeral 26 designates a delay circuit which is provided to compensate for the delay time caused by the low pass filter 28.

The subtracted output $S_{MO}$ (or $S_{ME}$) from the subtracter 29 is supplied to a delay circuit 31, delayed thereby by one horizontal scanning period and then supplied to an adder 32 which is also supplied with the video signals $S_O$ and $S_E$, which are not restricted in band from the delay circuit 26. Thus, the adder 32 produces the added output signal having the phase relationship shown in FIG. 6E.

The reason why the signals are processed with their low band side components being removed as described above is to avoid the vertical resolution from being deteriorated. If the signals containing low band side components, which may badly affect the resolution, are processed, the resolution may be deteriorated since the operational treatment is carried out. In the illustrated embodiment of the invention, there is carried out the process for removing the possibility of such deterioration.

The added output signal from the adder 32 is supplied again to a low pass filter 33 which passes the DC component $S_{DC}$. The DC component $S_{DC}$ from the low pass filter 33 is supplied to a rear stage matrix 35 through a delay circuit 34 which is provided to compensate for the delay caused by the color demodulation system. The output signal from the adder 32 is supplied to a band restricting circuit 36 which passes a desired side band component. If the output signal from the band restricting circuit 36 is supplied to a pair of detectors 37A and 37B whose detecting axes (demodulation axes) are different, one of the detectors, for example, the detector 37A, whose detecting axis is the cos-axis, detects (demodulates) a color component of $$\left(R - \frac{G+B}{2}\right)$$

and similarly the other detector 37B whose detecting axis is the sin-axis detects (demodulates) a color component of (B-G). Accordingly, if these detected output signals are supplied to the matrix circuit 35, desired video signals, for example, the luminance signal Y and color difference signals (R-Y) and (B-Y) of the NTSC system can be obtained at output terminals 35a, 35b and 35c led out from the matrix circuit 35.

As described above, in the present invention the special color filter 16 described in connection with FIG. 2 is used, and the video signals during the adjacent horizontal scanning periods are added together by utilizing their correlation to produce a desired video signal. With such a construction, the color camera portion of a color television camera apparatus can be formed by only one CCD 10, so that the construction of the color television camera apparatus becomes simple, and the affect of the side band component $S_M$ on the DC component $S_{DC}$ can be effectively avoided by the color filter 16 of relatively simple construction and signal process.

In the present invention, the color filter 16 is formed of one unit of the first and second filter elements 11A and 11B which is arranged repeatedly in the odd number horizontal scanning lines and one unit of the third and fourth filter elements 12A and 12B which is arranged repeatedly in the even number horizontal scanning lines as shown in FIG. 2, so that the color components are modulated by the ½ carrier (sampling frequency $f_c$). Thus, the frequency of the practical carrier of the present invention is $\frac{1}{2} f_c$.

Figure 7A:
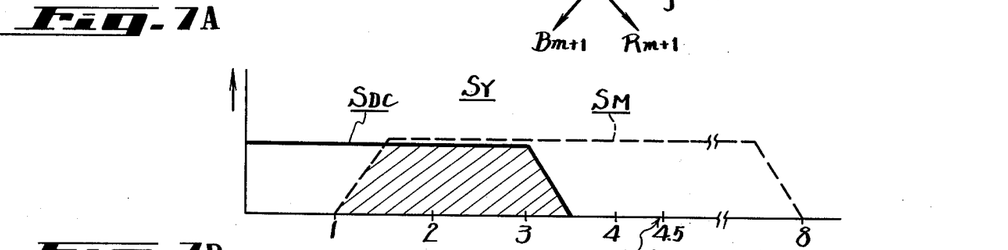
FIGS. 7A and 7B are frequency-spectra used for explaining the invention.

If the band of the DC component $S_{DC}$ is taken as 3.5 MHz and the sampling frequency $f_c$ is taken as 9.0 MHz for the sake of explanation, the frequency spectra thereof are shown in FIG. 7A, and the carrier of this case is 4.5 MHz in frequency. Accordingly, the sampling error caused by the side band component $S_M$ is produced more than 1.0 MHz, so that no sampling error is caused in the lower side of the DC component SDC which may affect the resolution, and hence without increasing the number of picture elements of the CCD 10 in the horizontal scanning direction (in the illustrated example, the number of picture elements in about 470) a relatively good quality of picture can be obtained.

Figure 7B:
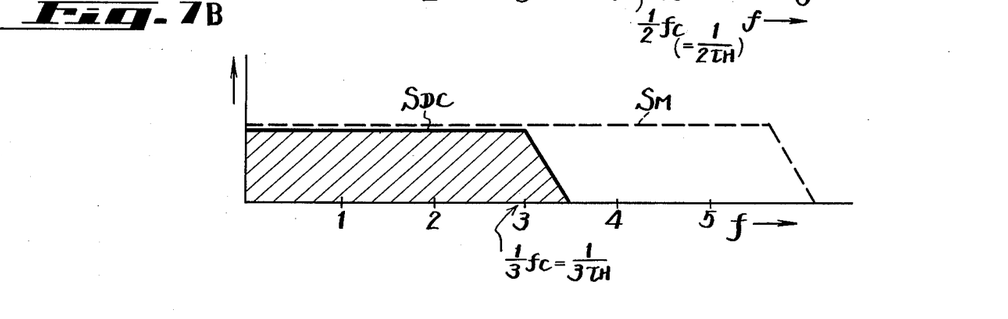

In the prior art, since three color filters (red R, green G and blue B filters) of strip shape are generally used, their frequency spectra are shown in FIG. 7B even if their frequency relationship is selected similar to the present invention, and the carrier frequency is $\frac{1}{3} f_c$ or 3.0 MHz. Thus, the sampling error appears all over the DC component $S_{DC}$ and accordingly no picture of good quality can be obtained.

The present invention is free from the above drawback of the prior art.

The color lights of the color filter 16 in the above example are shown in the first column I in the following Table - 1, but the color lights of the second and third columns II and III in the Table - 1 can be used with the same effect.

Table 1

| Color Light | Column | I | II | III |
|---|---|---|---|---|
| | First (11A) | R | G | R |
| Filter | Second (11B) | $C_y$ | M | $C_y$ |
| Element | Third (12A) | B | B | G |
| | Fourth (12B) | Yl | Yl | M |

With the example of the present invention described above, the low band contribution of the DC component in the output video signal which may affect the vertical resolution can be derived without being operationally processed (refer to FIGS. 6C and 6E), so that the resolution in the vertical direction can be increased.

In the above description, a 3-phase CCD 10 is used, but it is possible to use a 2-phase CCD in place of the 3-phase CCD 10.

Further, a diode array can be also used as the solid state camera.

It may be apparent that many modifications and variations of the preferred embodiment could be effected by one skilled in the art without departing from the scope of the novel concepts of the present invention.

I claim as my invention:

1. In a solid state television camera having a solid state image sensing device including a plurality of individual light sensing units arranged in both horizontal and vertical rows,
   means for establishing an image light path for casting an image on said image sensing means,
   a plurality of color filter elements being arranged in horizontal rows within said light path and each being of such size and location with respect to said light sensing units as to pass a portion of said image therethrough and display the same onto respective ones of said image sensing units, each horizontal row of said color filter elements containing ones of said elements having transmissibility selected for a primary color and other ones of said elements having transmissibility selected for a color which is complementary to said primary color, said primary color and complementary color elements being arranged alternately in each row, each odd numbered horizontal row having color filter elements which transmit the same primary and complementary colors as each other odd numbered row, each even numbered horizontal row having color filter elements which transmit the same primary and complementary colors as each other even numbered horizontal row but which colors are different than the primary and complementary colors of odd numbered horizontal rows, means for developing an image signal from each of said individual light sensing units in response to respective portions of an image being displayed thereon through respective ones of said color filter elements, and
   means for processing said image signal into a desired form of video signal.

2. A solid state camera in accordance with claim 1 wherein the complementary color filter elements of both odd and even horizontal rows have transmissability for a primary color which is different from the primary colors associated with either the odd or even horizontal rows.

3. A solid state television camera in accordance with claim 1, wherein said processing means includes two detectors, the detecting axes of which are 90° apart from each other, and the positions of respective image sensing units are so selected that vector components of side band components of signals obtained by adding image information from successive odd and even lines are symmetrical with respect to one of said detecting axes when panchromatic light is projected onto said color filter elements.

4. In a television camera the combination of a photo sensitive array comprised of individual photo sensing cells for producing a signal in relation to the light intensity projected thereon, a temporary storage array for storing electric charges generated by the light input to said photo sensing cells, a read out register for reading out signals from said temporary storage array, a filter array disposed in front of the photo sensitive array and having filter elements aligned with individual ones of said photo sensing cells, the filter elements being disposed in horizontal rows with the filter characteristics of alternate horizontal rows being alike and the filter characteristics of adjacent horizontal rows being dissimilar.

5. The combination of claim 4 wherein each row has filter elements for a primary color and its color complement, respectively, differerent primary colors being used in adjacent rows, and the filter elements transmitting the respective color complements also having characteristics for transmitting a common third primary color.

6. The combination of claim 5 wherein two detectors are provided to process the signal read out from the temporary storage array and wherein the positions of respective image sensing units are so selected that vector components of side band components of signals obtained by adding image information from successive odd and even lines are symmetrical with respect to one of the detecting axes of said detectors when panchromatic light is projected onto said color filter elements.

* * * * *